(12) United States Patent
Nishii (10) Patent No.: US 12,435,755 B2
(45) Date of Patent: Oct. 7, 2025

(54) METHOD FOR DESIGNING QUATERNION JOINT AND QUATERNION JOINT

(71) Applicant: TOYOTA JIDOSHA KABUSHIKI KAISHA, Toyota (JP)

(72) Inventor: Kazutoshi Nishii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 18/378,194

(22) Filed: Oct. 10, 2023

(65) Prior Publication Data

US 2024/0133422 A1 Apr. 25, 2024
US 2024/0229859 A9 Jul. 11, 2024

(30) Foreign Application Priority Data

Oct. 21, 2022 (JP) .................................. 2022-169444

(51) Int. Cl.
 *F16C 11/06* (2006.01)
(52) U.S. Cl.
 CPC .................................. *F16C 11/0685* (2013.01)
(58) Field of Classification Search
 CPC ..... Y10T 403/32606; Y10T 403/62008; F16C 11/0685; F16C 11/06; F16C 11/0695; B64G 1/2229; B64G 1/2225; B64G 1/44
 See application file for complete search history.

(56) References Cited

U.S. PATENT DOCUMENTS

| | | | | |
|---|---|---|---|---|
| 8,992,108 B2* | 3/2015 | Baudasse | ............. | B64G 1/2229 |
| | | | | 244/172.6 |
| 9,227,739 B2* | 1/2016 | Baudasse | ............. | B64G 1/2229 |
| 2009/0282646 A1* | 11/2009 | Baudasse | ............. | B64G 1/2229 |
| | | | | 16/273 |
| 2012/0137801 A1* | 6/2012 | Baudasse | ................. | E05D 3/06 |
| | | | | 74/89.14 |
| 2021/0197407 A1 | 7/2021 | Kim et al. | | |

FOREIGN PATENT DOCUMENTS

| | | |
|---|---|---|
| CN | 110480676 A | 11/2019 |
| CN | 112894780 A | 6/2021 |

* cited by examiner

*Primary Examiner* — Daniel J Wiley
(74) *Attorney, Agent, or Firm* — Dinsmore & Shohl LLP (57) ABSTRACT

In a method for designing a quaternion joint where a first member rotatably coupled to a second member through links, a distance $h_c$ between both ends of the link at an initial position of an operating angle of the link, a distance $w_c$ between ends of the adjacent links, and a distance ho required to secure a degree of freedom of the end of the link are set based on a constraint condition in which a distance between a point on an ellipse corresponding to the start operating angle of the link and a point at which a center point of the ellipse is shifted by the distance ho and a distance between a point on the ellipse corresponding to an end operating angle of the link and a point at which the center point of the ellipse is shifted by the distance ho are made equal to each other.

3 Claims, 7 Drawing Sheets

METHOD FOR DESIGNING QUATERNION JOINT AND QUATERNION JOINT

CROSS REFERENCE TO RELATED APPLICATIONS

This application is based upon and claims the benefit of priority from Japanese patent application No. 2022-169444, filed on Oct. 21, 2022, the disclosure of which is incorporated herein in its entirety by reference.

BACKGROUND

The present disclosure relates to a method for designing a quaternion joint and a quaternion joint.

A method for designing a quaternion joint is known in which when the operating angle of a link is set to 0 deg as the median value and the operating angle is changed from it, parameters are analytically set so as to reduce the variation width of a distance (link length) between the point on an elliptical trajectory drawn by the intersection point of the link and the point at which the center point of the ellipse is shifted by a distance $h_0$ (see, for example, United States Patent Application Publication No. 2021/0197407).

SUMMARY

The distance between the above point on the elliptical trajectory drawn by the intersection point of the link and the above point at which the center point of the ellipse is shifted by the distance $h_0$ varies according to the operating angle of the link. However, when the variation of this distance is large, the positional accuracy of the tip of the link may deteriorate.

The present disclosure has been made to solve the above problem, and one of the main objects thereof is to provide a method for designing a quaternion joint and a quaternion joint that are capable of improving the positional accuracy of a tip of a link.

In order to achieve the above-described object, one exemplary aspect according to the present disclosure is a method for designing a quaternion joint including a first member and a second member rotatably coupled to the first member through a plurality of links, the method including setting a distance $h_c$ between both ends of the link at a start operating angle of the link, a distance $w_c$ between ends of the adjacent links, and a distance $h_0$ required to secure a degree of freedom of the end of the link based on a constraint condition in which, regarding an elliptical trajectory drawn by an intersection point of the links in accordance with a rotation of the second member, a distance between a point on the ellipse corresponding to the start operating angle of the link and a point at which a center point of the ellipse is shifted by the distance $h_0$ and a distance between a point on the ellipse corresponding to an end operating angle of the link and a point at which the center point of the ellipse is shifted by the distance $h_0$ are made equal to each other.

In the above one exemplary aspect, when the start operating angle of the link is set to 0 deg and the end operating angle of the link is set to 45 deg, the distances $h_c$, $w_c$, and $h_0$ may be set so as to satisfy the following expression indicating the constraint condition.

[Expression]

$$h_c = \frac{(w_c/2)^2 - (3 - 2\sqrt{2})h_0^2}{(2 - \sqrt{2})h_0} \quad (2)$$

In order to achieve the above-described object, one exemplary aspect according to the present disclosure is a quaternion joint comprising a first member and a second member rotatably coupled to the first member through a plurality of links, in which a distance $h_c$ between both ends of the link at a start operating angle of the link, a distance $w_c$ between ends of the adjacent links, and a distance $h_0$ required to secure a degree of freedom of the end of the link are set based on a constraint condition in which, regarding an elliptical trajectory drawn by an intersection point of the links in accordance with a rotation of the second member, a distance between a point on the ellipse corresponding to the start operating angle of the link and a point at which a center point of the ellipse is shifted by the distance $h_0$ and a distance between a point on the ellipse corresponding to an end operating angle of the link and a point at which the center point of the ellipse is shifted by the distance $h_0$ are made equal to each other.

According to the present disclosure, it is possible to provide a method for designing a quaternion joint and a quaternion joint that are capable of improving the positional accuracy of a tip of a link.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

An embodiment according to the present disclosure will be described hereinafter with reference to the drawings. A quaternion joint according to this embodiment is mounted on a joint part such as a wrist joint of a robot.

Figure 1:
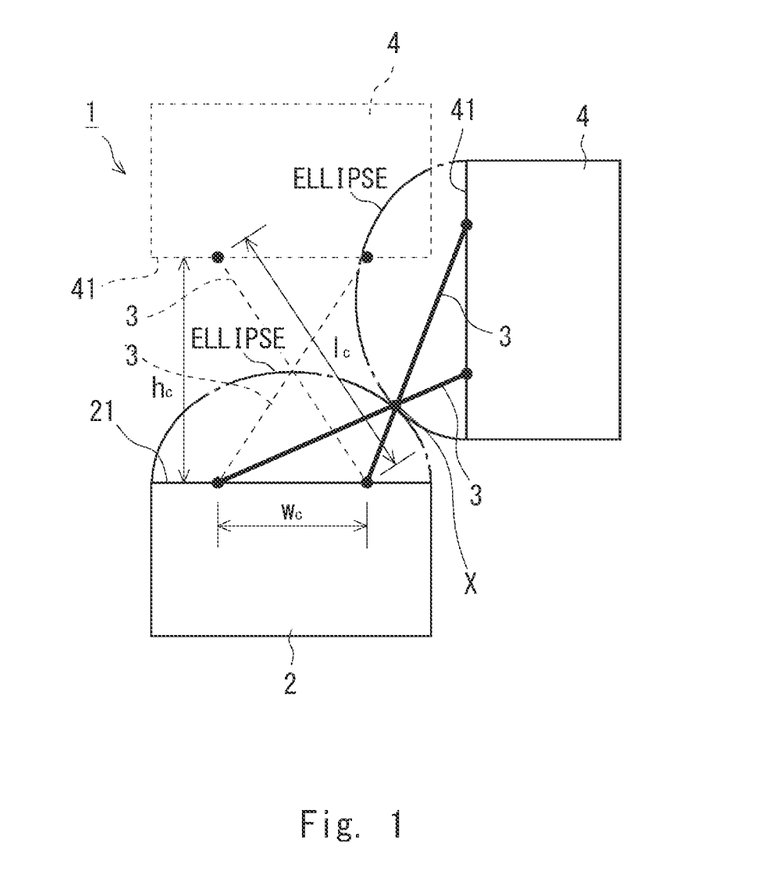
FIG. 1 is a schematic diagram of a quaternion joint according to an embodiment.

FIG. 1 is a schematic diagram of the quaternion joint according to this embodiment. A quaternion joint 1 includes a first member 2 and a second member 4 rotatably coupled to the first member 2 through a plurality of links 3 that intersect each other in a side view.

Both ends of each of the links 3 are coupled to end faces 21 and 41 of the first and second members 2 and 4, respectively, through a swing mechanism. As described below, the swing mechanism can, for example, swing the links 3 in any direction by rotating the links 3 around two rotation shafts, that is, first and second rotation shafts, arranged so that they are perpendicular to each other and stacked on each other.

In the quaternion joint 1, each of the links 3 is disposed so that an imaginary hemispherical shape, which is a trajectory of an intersection point X of the links 3, is formed on each of the end face 21 of the first member 2 and the end face 41 of the second member 4 and the second member 4 is rotated while the hemispherical shapes are in contact with each other at the intersection point X. Note that, in this embodiment, although the number of links 3 is three, it is not limited thereto, and the number of links 3 may be set to any number, e.g., two, four, or larger, if the above operation condition is satisfied.

Figure 2:
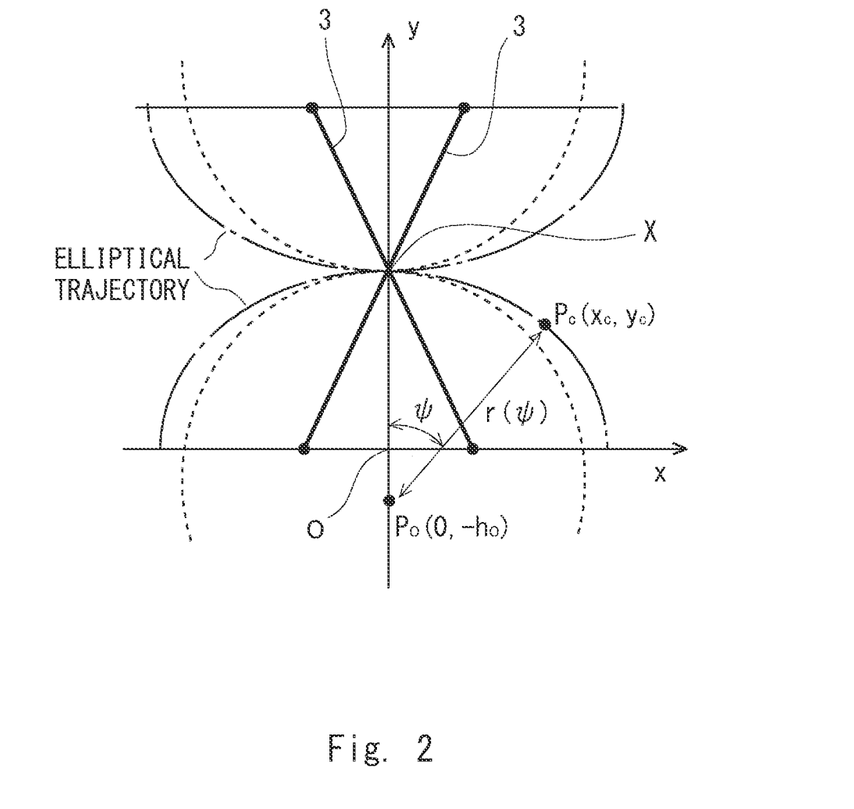
FIG. 2 is a diagram showing a link length r ($\psi$) of the quaternion joint.

Note that, as shown in FIG. 2, the intersection point X of the links 3 draws an elliptical trajectory in accordance with a rotation of the second member 4. A link length r ($\psi$) of the quaternion joint 1 is a distance between a point $P_0(0, -h_c)$ at which a center point O of the ellipse is shifted by a distance $h_0$ and a point $P_C(x_c, y_c)$ on the ellipse corresponding to an operating angle $\psi$ of the link 3. The link length r ($\psi$) is derived, for example, by the following Expression (1).

[Expression]

$$r(\psi) = \frac{h_0 + \sqrt{h_0^2 + \left(1 + \left(\frac{h_c}{l_c}\tan\psi\right)^2\right)\left(\left(\frac{h_c}{2}\right)^2 - h_0^2\right)}}{\sin\psi\left(1 + \left(\frac{h_c}{l_c}\tan\psi\right)^2\right)} \quad (1)$$

Note that a distance $h_c$ between both ends of the link 3 at a start operating angle of the link 3, a distance w c between the ends of adjacent links 3, a length $l_c$ of the link 3, and the distance $h_0$ required to secure a degree of freedom of the end of the link 3. The start operating angle of the link 3 is the operating angle $\psi$ at an initial position of the link 3. The distance $h_0$ is, for example, a distance between the first and the second rotation shafts of the end of the link 3 as described later.

Note that the link length r ($\psi$) varies according to the operating angle $\psi$ of the link 3. Conventionally, the above-described parameters $h_c$, $w_c$, and $h_0$ are obtained and set analytically so that $\psi=0$ deg is used as the median value and the variation width is reduced from this value. Therefore, when the variation of the link length r ($\psi$) becomes large, the positional accuracy of the tip of the link deteriorates. Further, for example, when a joint is driven by a wire, the wire length varies greatly according to the operating angle $\psi$, and the rigidity of the joint varies greatly. Therefore, it may be difficult to perform control since the positioning accuracy varies depending on the posture.

On the contrary, in a method for designing the quaternion joint 1 according to this embodiment, the above parameters $h_c$, $w_c$, and $h_0$ are set based on a constraint condition in which a link length r ($\psi$1) corresponding to a start operating angle $\psi$1 of the link 3 and a link length r ($\psi$2) corresponding to an end operating angle $\psi$2 of the link 3 are made equal to each other.

By doing so, the variation width of the link length r ($\psi$) can be made smaller than that of the related art, and thus the positional accuracy of the tip of the link can be improved. Further, optimum values of the parameters can be easily designed without using an analytical method such as a parameter study.

Further, for example, even when a joint is driven by a wire, the variation of the wire length according to the operating angle $\psi$ can be kept small, and the variation of the rigidity of the joint can also be kept small. As a result, the positioning accuracy according to the posture can be improved, and thus the controllability can be improved.

For example, when the start operating angle $\psi$1 of the link 3 is set to 0 deg ($\psi$1=0 deg) and the end operating angle $\psi$2 of the link 3 is set to 45 deg ($\psi$2=45 deg), the constraint condition in which a link length r ($\psi$1) corresponding to the start operating angle $\psi$1 of the link 3 and a link length r ($\psi$2) corresponding to the end operating angle $\psi$2 of the link 3 are made equal to each other is the following Expression (2). The end operating angle $\psi$2 of the link 3 described above is an operating angle $\psi$2 at an end position of the link 3.

Note that the end operating angle $\psi$2 of the link 3 is set to 45 deg as described above by taking into account the maximum operating angle of the quaternion joint 1.

Therefore, by setting the parameters $h_c$, $w_c$, and $h_0$ so as to satisfy Expression (2) of the constraint condition, the maximum operating angle of quaternion joint 1 can be taken into account and then the variation width of the link length r ($\psi$) can be made smaller than that of the related art. As a result, the positional accuracy of the tip of the link can be improved.

[Expression]

$$h_c = \frac{(w_c/2)^2 - (3 - 2\sqrt{2})h_0^2}{(2 - \sqrt{2})h_0} \quad (2)$$

Figure 3:
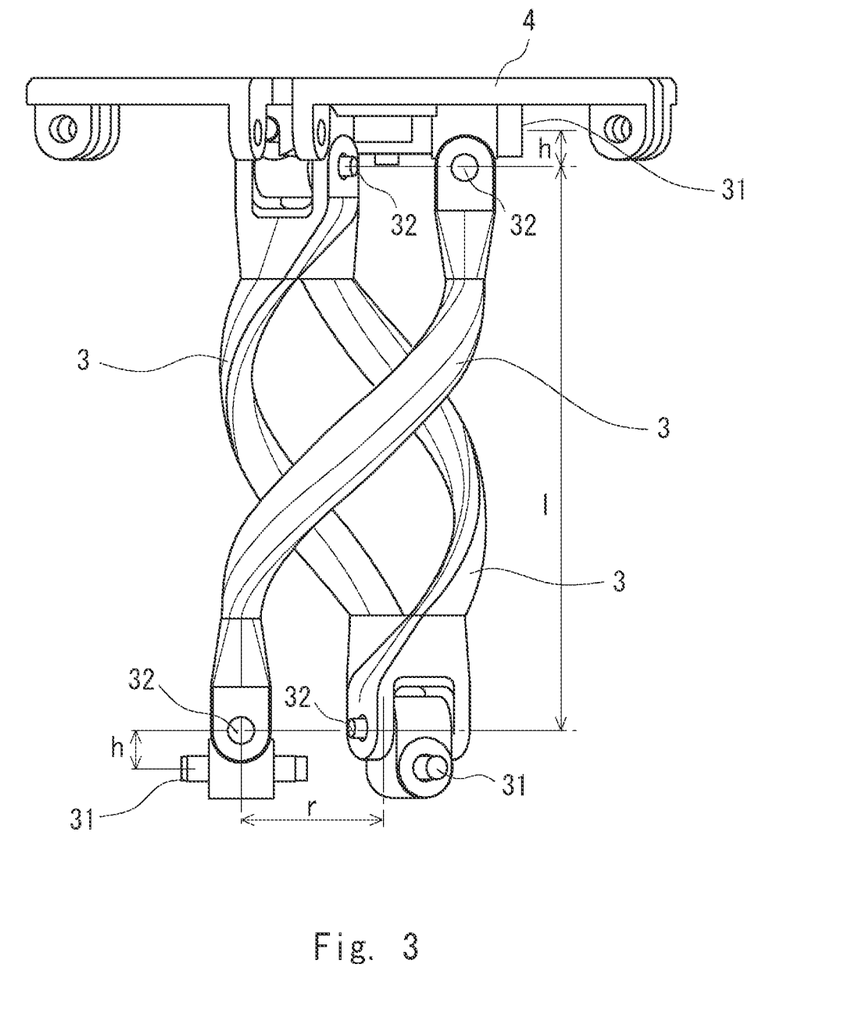
FIG. 3 is a side view of each link of the quaternion joint according to the embodiment and a diagram for explaining each parameter.

Next, a method for deriving the above Expression (2) will be described in detail. FIG. 3 is a side view of each link of the quaternion joint according to this embodiment and a diagram for explaining each parameter. Each parameter is set as shown in FIG. 3.

Note that the parameters shown in FIG. 1 and FIG. 3 correspond to each other as follows: $h_c=1$, $w_c/2=r$, $h_0=h$. Further, the distance h is a distance between a first rotation shaft 31 and a second rotation shaft 32 of the end of the link 3, which shafts are arranged so that they are perpendicular to each other and stacked on each other.

Figure 4:
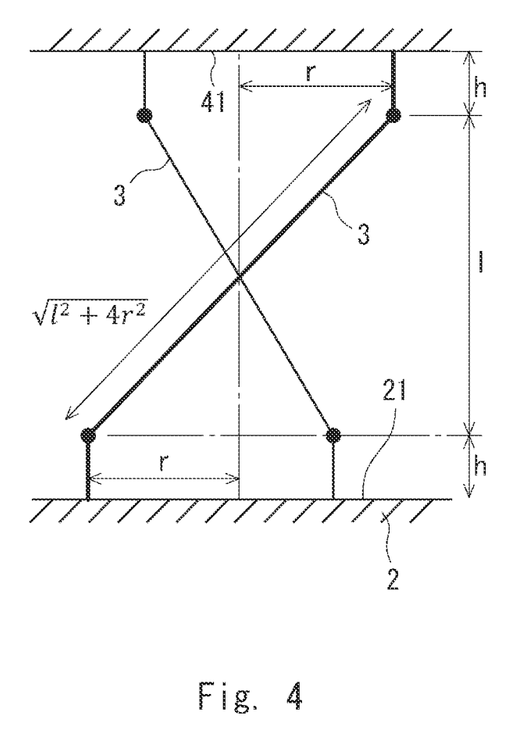
FIG. 4 is a schematic diagram showing a state of each link when a start operating angle $\psi1$ of the link is set to 0 deg.
Figure 5:
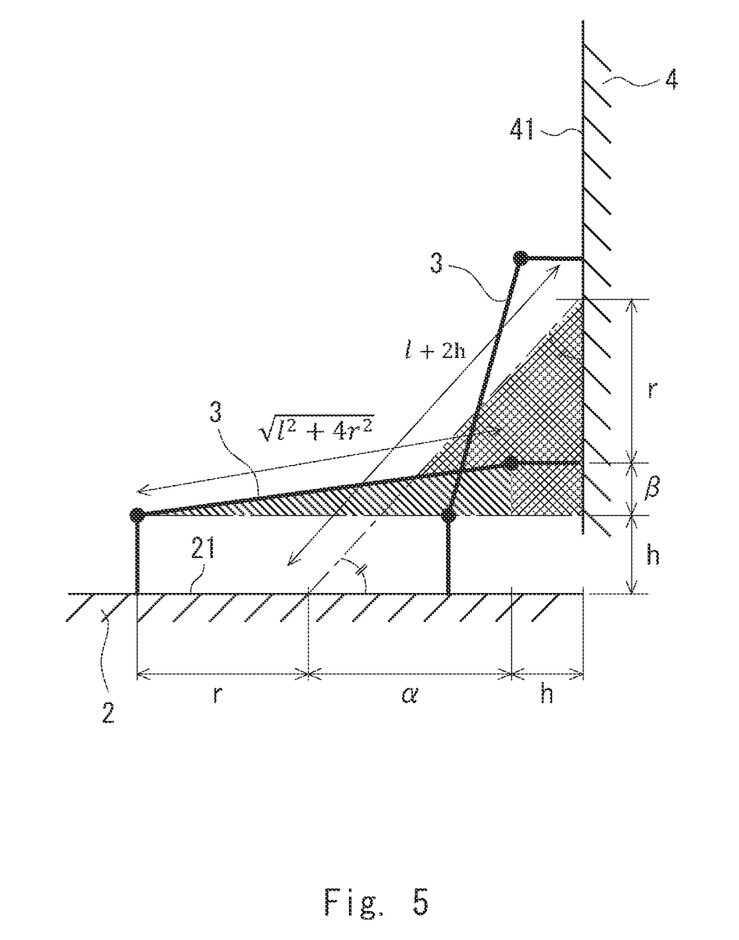
FIG. 5 is a schematic diagram showing a state of each link when an end operating angle $\psi2$ of the link is set to 45 deg.

FIG. 4 is a schematic diagram showing a state of each link when the start operating angle $\psi$1 of the link is set to 0 deg ($\psi$1=0 deg). FIG. 5 is a schematic diagram showing a state of each link when the end operating angle $\psi$2 of the link is set to 45 deg ($\psi$2=45 deg).

Note that, as a characteristic of the mechanism, a distance (l+2r) between the centers is not varied. Further, the inclination of the end face 21 of the first member 2 and the inclination of the end face 41 of the second member 4 relative to the center axis are always equal to each other.

By focusing on a triangle (a hatched part) shown in FIG. 5, the following Expressions (3) and (4) are derived from the geometric relationship.

[Expression]

$$a + h = r + \beta + h = (l + 2h)/\sqrt{2} \quad (3)$$

$$l^2 + 4r^2 = (a+r)^2 + \beta^2 \quad (4)$$

The following Expressions (5) and (6) are derived from the above Expression (3).

[Expression]

$$a = \frac{(l+2h)}{\sqrt{2}} - h = \frac{l + (2-\sqrt{2})h}{\sqrt{2}} \quad (5)$$

$$\beta = a - r \quad (6)$$

By substituting the above Expression (6) into the above Expression (4), the following Expression (7) is derived.

[Expression]

$$l^2 + 4r^2 = (a+r)^2 + (a-r)^2 \quad (7)$$
$$= 2a^2 + 2r^2$$
$$l^2 + 2r^2 - 2a^2 = 0$$

By substituting the above Expression (5) into the above Expression (7), the following Expression (8) is derived. Since $h_c=1$, $w_c/2=r$, and $h_0=h$ as described above, the following Expression (8) is identical to the above Expression (2).

[Expression]

$$l^2 + 2r^2 - 2\left(\frac{1 + (2-\sqrt{2})h}{\sqrt{2}}\right)^2 = 0 \quad (8)$$

$$l^2 + 2r^2 - (1 + (2-\sqrt{2})h)^2 = 0$$

$$l^2 + 2r^2 - l^2 - 2l(2-\sqrt{2})h - (6-4\sqrt{2})h^2 = 0$$

$$r^2 - l(2-\sqrt{2})h - (3-2\sqrt{2})h^2 = 0$$

$$\therefore l = \frac{r^2 - (3-2\sqrt{2})h^2}{(2-\sqrt{2})h}$$

In the above description, the start operating angle ψ1 of the link 3 is set to 0 deg (ψ1=0 deg) and the end operating angle ψ2 of the link 3 is set to 45 deg (ψ2=45 deg). However, the present disclosure is not limited thereto.

For example, the end operating angle ψ2 of the link 3 may be an angle of no smaller than 40 deg and no larger than 45 deg. In this case, like in the above case of the end operating angle ψ2=45 deg of the link 3, an expression of the constraint condition can be calculated from the geometric relationship.

By setting the parameters 1, r, and h so as to satisfy the above Expression (8), the variation width of the link length r (ψ) can be reduced. However, the lower limit of r is determined by the interference of the link 3, and as shown in FIG. 5, the lower limit of 1 is determined by the interference of upper and lower pulleys in a 90 deg bent state (ψ2=45 deg). Therefore, an appropriate h is selected within the above lower limits of r and l.

Figure 6:
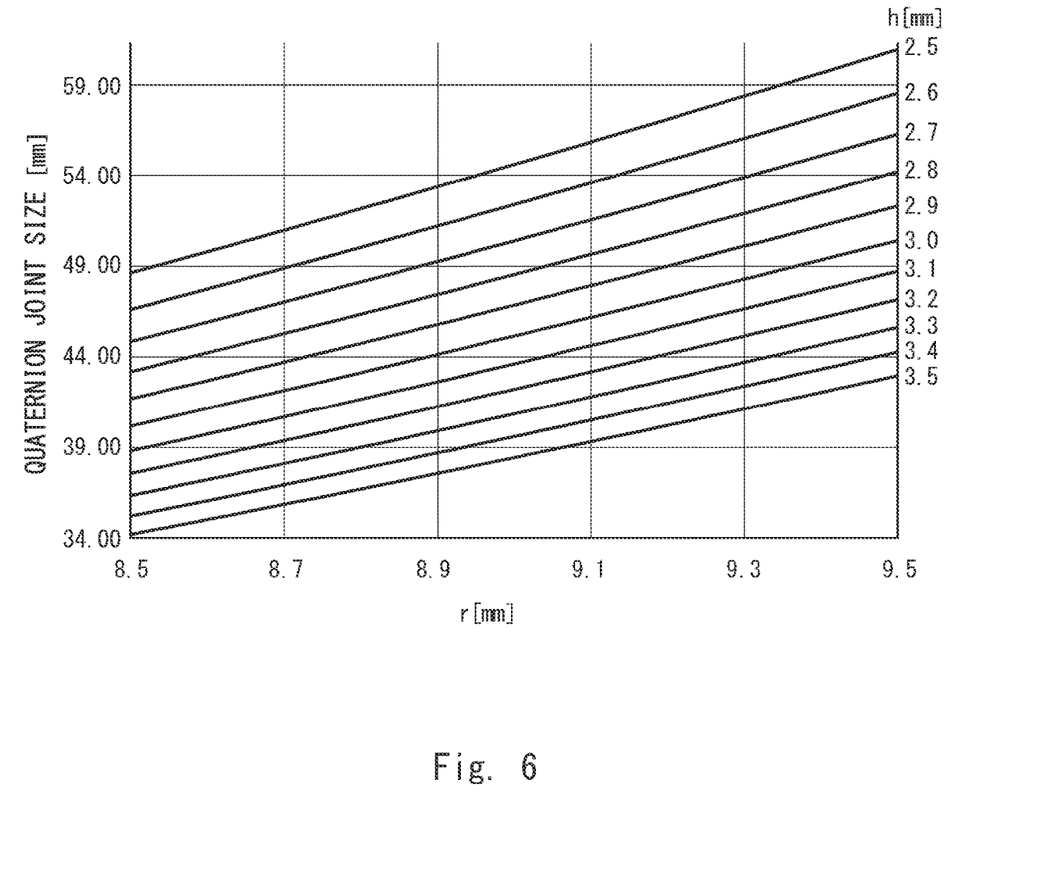
FIG. 6 is a diagram showing a relationship between parameters r and h and a size of the quaternion joint.

FIG. 6 is a diagram showing a relationship between the parameters r and h and a size of the quaternion joint. FIG. 6 shows the results of measuring the size of the quaternion joint for each of the parameters h of 2.5 mm to 3.5 mm. Note that, since the parameters h and r become small values, a fractional adjustment is performed in l for machining accuracy.

As shown in FIG. 6, the size of the quaternion joint 1 is reduced as the value of the parameter h increases. Further, the size of the quaternion joint 1 increases as the value of the parameter r increases. By explicitly determining the relationship shown in FIG. 6, an appropriate h can be selected within the above lower limit of r and l.

Next, the variation width of the link length r (ψ) of the quaternion joint designed by the method for designing a quaternion joint according to this embodiment will be described.

As described above, FIG. 7 is a diagram showing a comparison between a variation width of the link length of the quaternion joint designed by the design method according to this embodiment and a variation width of the link length of the quaternion joint designed by a design method according to the related art.

Figure 7:
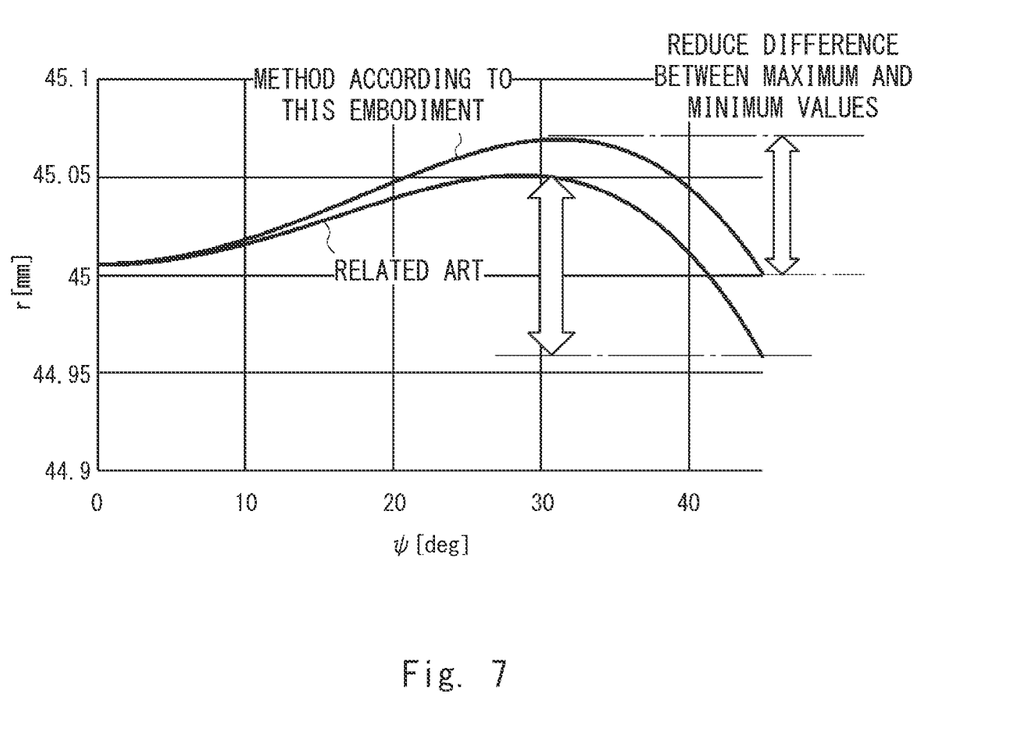
FIG. 7 is a diagram showing a comparison between a variation width of the link length of the quaternion joint designed by a design method according to the embodiment and a variation width of the link length of the quaternion joint designed by a design method according to related art.

As shown in FIG. 7, it can be seen that the difference between the maximum and minimum values of the variation width of the link length r (ψ) of the quaternion joint 1 designed by the design method according to this embodiment is smaller than that of the variation width of the link length r (ψ) of the quaternion joint designed by the design method according to the related art. That is, by designing the quaternion joint 1 using the design method according to this embodiment, the variation width of the link length r (ψ) of the quaternion joint 1 can be reduced, and thus the positional accuracy of the tip of the link can be improved.

As described above, in the method for designing the quaternion joint 1 according to this embodiment, the distance $h_c$ between the end face 21 of the first member 2 and the end face 41 of the second member 4 at the start operating angle ψ1 of the link 3, the distance $\psi_c$ between ends of the adjacent links 3, and the distance $h_0$ required to secure a degree of freedom of the end of the link 3 are set based on a constraint condition in which, regarding an elliptical trajectory drawn by an intersection point X of the links 3 in accordance with a rotation of the second member 4, a distance between a point on the ellipse corresponding to the start operating angle ψ1 of the link 3 and a point at which the center point O of the ellipse is shifted by the distance $h_0$ and a distance between a point on the ellipse corresponding to the end operating angle ψ2 of the link and a point at which the center point O of the ellipse is shifted by the distance $h_0$ are made equal to each other.

By doing the above, the variation width of the link length r (ψ) can be reduced, and thus the positional accuracy of the position of the link can be improved.

Several novel embodiments according to the present disclosure have been described above. However, these embodiments are merely presented as examples and are not intended to limit the scope of the disclosure. These novel embodiments can be implemented in various forms. Further, their components/structures may be omitted, replaced, or modified without departing from the scope and the spirit of the disclosure. These embodiments and modifications thereof are included in the scope and the spirit of the disclosure and also included in the disclosure specified in the claims and the scope equivalent thereto.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for designing a quaternion joint comprising a first member and a second member rotatably coupled to the first member through a plurality of links, the method comprising setting a distance $h_c$ between both ends of the link at a start operating angle of the link, a distance $w_c$ between ends of the adjacent links, and a distance $h_0$ required to secure a degree of freedom of the end of the link based on a constraint condition in which, regarding an elliptical trajectory drawn by an intersection point of the links in accordance with a rotation of the second member, a distance between a point on the ellipse corresponding to the start operating angle of the link and a point at which a center point of the ellipse is shifted by the distance $h_0$ and a distance between a point on the ellipse corresponding to an end operating angle of the link and a point at which the center point of the ellipse is shifted by the distance $h_0$ are made equal to each other.

2. The method according to claim 1, wherein when the start operating angle of the link is set to 0 deg and the end operating angle of the link is set to 45 deg, the distances $h_c$, $w_c$, and $h_0$ are set so as to satisfy the following expression indicating the constraint condition

[Expression]

$$h_c = \frac{(w_c/2)^2 - (3 - 2\sqrt{2})h_0^2}{(2 - \sqrt{2})h_0}. \tag{2}$$

3. A quaternion joint comprising a first member and a second member rotatably coupled to the first member through a plurality of links, wherein a distance $h_c$ between both ends of the link at a start operating angle of the link, a distance $w_c$ between ends of the adjacent links, and a distance $h_0$ required to secure a degree of freedom of the end of the link are set based on a constraint condition in which, regarding an elliptical trajectory drawn by an intersection point of the links in accordance with a rotation of the second member, a distance between a point on the ellipse corresponding to the start operating angle of the link and a point at which a center point of the ellipse is shifted by the distance $h_0$ and a distance between a point on the ellipse corresponding to an end operating angle of the link and a point at which the center point of the ellipse is shifted by the distance $h_0$ are made equal to each other.

* * * * *